(12) United States Patent
Dixon

(10) Patent No.: US 8,317,378 B2
(45) Date of Patent: Nov. 27, 2012

(54) BIMODAL ILLUMINATION FOR VEHICULAR STORAGE COMPARTMENT

(75) Inventor: Mark Edward Dixon, Farmington Hills, MI (US)

(73) Assignee: Magna Electronics, Inc., Auburn Hills, MI (US)

( * ) Notice: Subject to any disclaimer, the term of this patent is extended or adjusted under 35 U.S.C. 154(b) by 404 days.

(21) Appl. No.: 12/765,202

(22) Filed: Apr. 22, 2010

(65) Prior Publication Data

US 2010/0270928 A1 Oct. 28, 2010

Related U.S. Application Data

(60) Provisional application No. 61/171,590, filed on Apr. 22, 2009.

(51) Int. Cl.
*B60Q 1/26* (2006.01)

(52) U.S. Cl. .................................... 362/488; 362/276

(58) Field of Classification Search .................. 362/488, 362/489–492, 471, 548, 549, 540, 487, 496, 362/276, 802, 234, 253; 40/593
See application file for complete search history.

(56) References Cited

U.S. PATENT DOCUMENTS

| | | | | |
|---|---|---|---|---|
| 6,234,439 | B1 * | 5/2001 | Townsend et al. | 248/311.2 |
| 6,896,387 | B2 * | 5/2005 | Renfro | 362/602 |
| 7,654,680 | B2 * | 2/2010 | Kukucka et al. | 362/84 |
| 7,708,436 | B2 * | 5/2010 | Lota | 362/488 |
| 8,162,520 | B2 * | 4/2012 | Penner | 362/488 |
| 2007/0139943 | A1 * | 6/2007 | Bone et al. | 362/488 |
| 2010/0296304 | A1 * | 11/2010 | Hayes et al. | 362/488 |

* cited by examiner

*Primary Examiner* — Bao Q Truong
(74) *Attorney, Agent, or Firm* — Gardner, Linn, Burkhart & Flory, LLP

(57) ABSTRACT

Bimodal illumination for vehicular storage compartment utilizes two or more light sources for illuminating the storage compartment, a removable divider to establish two or more sub-compartments when the divider is inserted into the storage compartment, and a switch for selectively turning on and off one or more of the light sources. The switch is opened and closed by the presence of the removable divider in the storage compartment.

3 Claims, 5 Drawing Sheets

BIMODAL ILLUMINATION FOR VEHICULAR STORAGE COMPARTMENT

This application claims the benefits of U.S. Provisional Application No. 61/171,590, filed Apr. 22, 2009.

FIELD OF THE INVENTION

The invention relates to the art of illumination, and more particularly to illuminating a storage compartment in a vehicle.

BACKGROUND OF THE INVENTION

Vehicular storage compartments are routinely present in vehicles and utilized for a variety of purposes.

It may be desirable for a vehicular storage compartment to be utilized for multiple purposes. A removable divider may be provided so that the storage compartment can be compartmentalized into smaller storage spaces. For instance, an appropriately shaped divider may be provided to snugly hold two cups in a single storage space, and that divider may be readily removed to utilize the storage space for other purposes.

It is desirable to illuminate such a compartmentalized storage space in conformity to its use.

SUMMARY OF THE INVENTION

According to one aspect of the invention, a vehicular storage compartment is provided which includes two or more light sources for illuminating the storage compartment. A removable divider establishes two or more sub-compartments when the divider is inserted into the storage compartment. A switch selectively turns on and off one or more of the light sources, the switch being opened and closed by the presence of the removable divider in the storage compartment.

According to another aspect of the invention, which is particularly suited to a storage space that comes with a divider suited to hold cups, when the divider is not in place, the light source for the storage space is hidden from view. When the divider is installed, the lighting changes to illuminate the divider from inside the storage space.

BRIEF DESCRIPTION OF THE DRAWINGS

The foregoing and other aspects of the invention will be understood by way of the accompanying drawings, in which.

DETAILED DESCRIPTION OF THE INVENTION

Figure 1A:
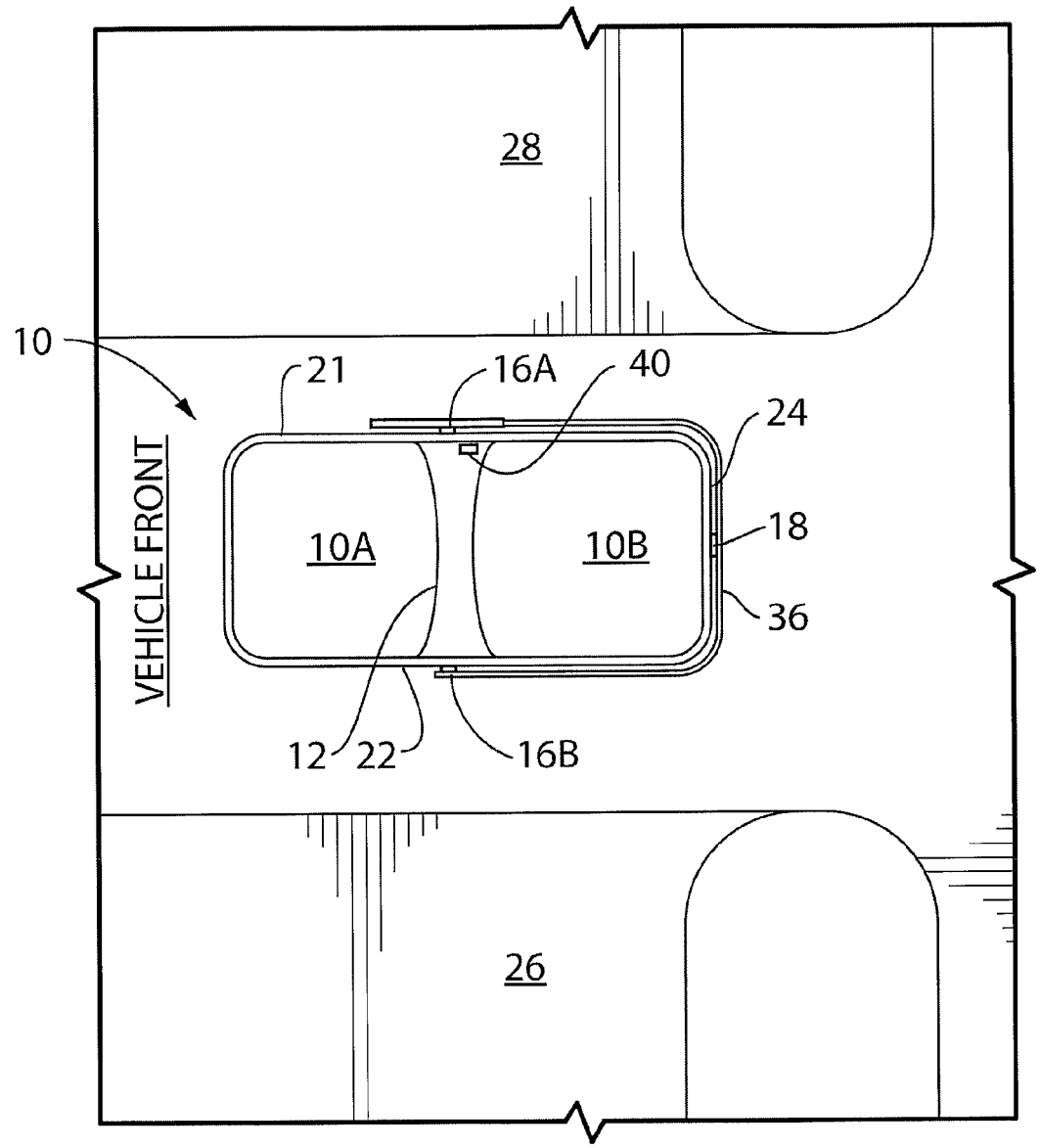
FIG. 1A is a schematic plan diagram of a vehicular storage compartment having a removable divider installed therein.

FIG. 1A is a schematic plan view showing a vehicular storage compartment 10 that can be compartmentalized into smaller sub-compartments 10A and 10B via a removable divider 12. In the illustration the compartment 10 is a relatively small storage space sized to hold the bases of two cups. The storage compartment 10 may be located in a variety of different areas in the vehicle. For instance, the storage compartment 10 may be located in a center console area between two seats, or on the side of the vehicle adjacent to a door or side window or wall.

Figure 1B:
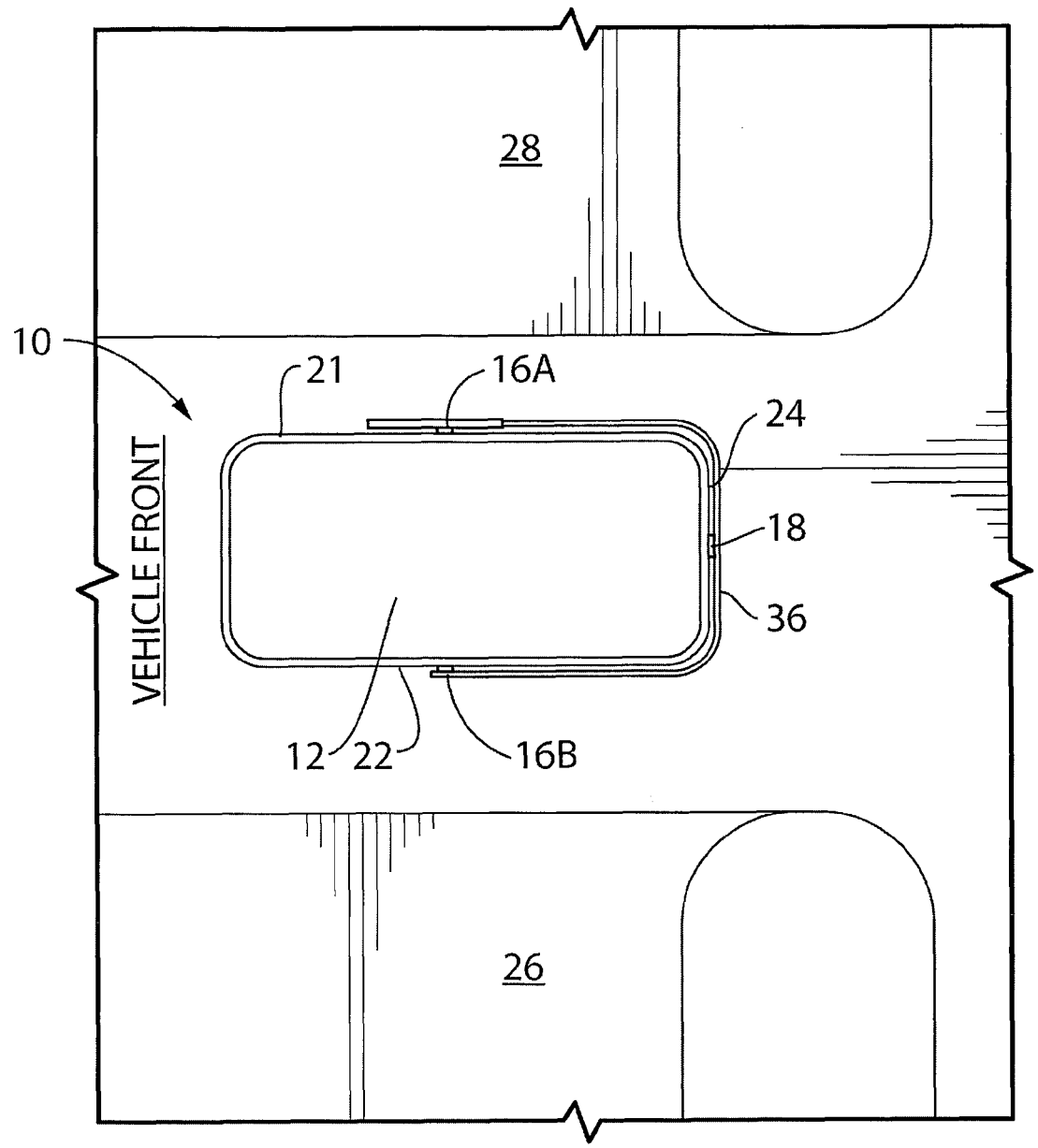
FIG. 1B is a schematic plan diagram of a vehicular storage compartment without the removable divider.

It is desirable to illuminate the storage compartment 10 in conformance with its use. For example the storage compartment 10 may hold one or more cups when the divider 12 is installed, or may be used to store other items when the divider 12 is removed as shown in FIG. 1B. In the former case, when the divider 12 is installed, it is desired to illuminate the divider 12 from inside the storage compartment 10. In the latter case, when the divider 12 is removed, it is desirable to eliminate any glare from the light sources from the view of the occupants, especially if the storage compartment 10 is located near the driver. In particular, if the light sources that illuminate the divider when it is present were active, these light sources would create unwanted distraction to the occupants.

To achieve the different modes of illumination, the storage compartment 10 is equipped with three light sources 16A, 16B and 18. Two of these light sources 16A, 16B are disposed on or adjacent opposing sidewalls 21, 22 of the storage compartment, at a location at or near the installation position of the divider 12. The third light source 18 is disposed on another sidewall 24 preferably located between the opposing sidewalls 21, 22. In the preferred embodiment, the storage compartment 10 is located between driver and passenger front seats 26, 28, and the wall 24 is the rearward-most wall relative to the front of the vehicle.

Figure 2:
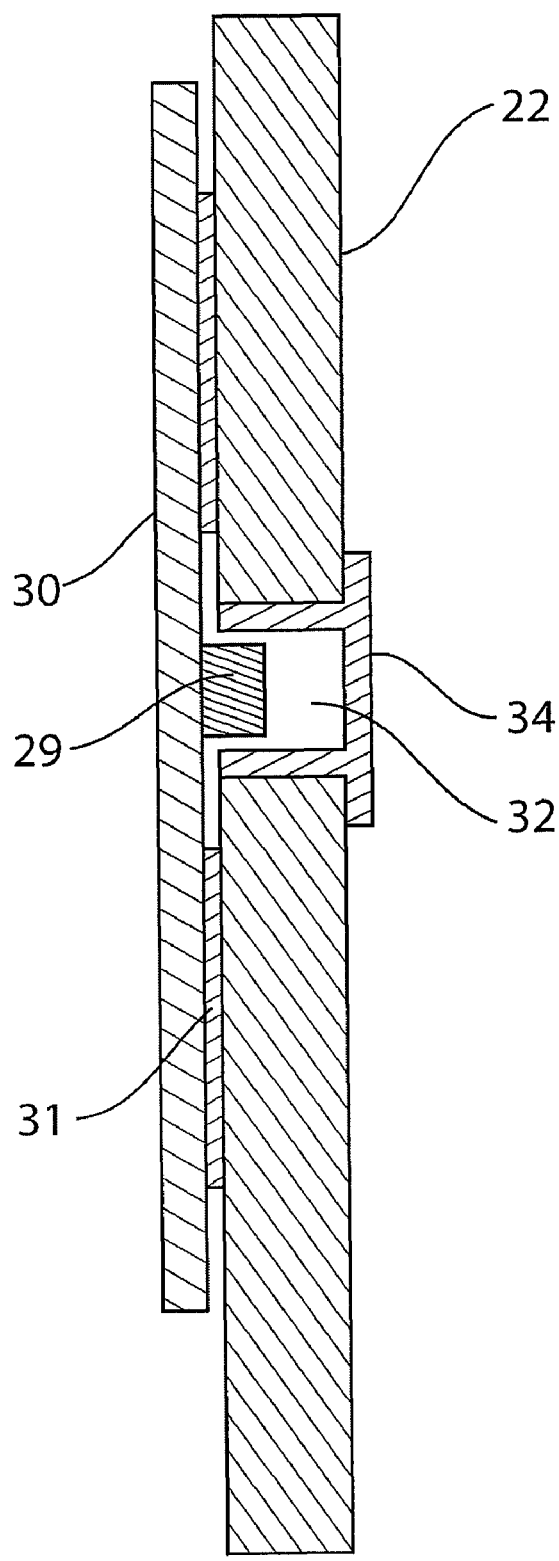
FIG. 2 is a partial cross-sectional view along a wall of the storage compartment where a light source is installed.

Referring additionally to the partial cross-sectional view FIG. 2, the light sources are preferably light emitting diodes (LEDs) 29 mounted on a printed circuit board (PCB) 30 or other substrate disposed behind the corresponding sidewall of the storage compartment. The PCB 30 or other substrate is preferably mounted to the storage compartment sidewall via double sided tape 31, but it will be understood that there are many other suitable automotive adhesives or fasteners that may be employed. An opening or aperture 32 is formed in the sidewall and a transparent or translucent aperture cover 34 is installed in or about the aperture 32 to permit the passage of light into the storage compartment 10. The aperture cover 34 may have optical properties as known in the art per se to direct or distribute the light within the storage compartment 10. For instance, the aperture cover 34 may be a combination diffuser and fresnel lens to evenly illuminate and direct the light as desired.

The PCB 30 is preferably small in size and mounted to one of the sidewalls 21, 22. In order to bring power to the LEDs that are not directly mounted to the rigid PCB 30, a flexible extension such as a ribbon 36 (FIG. 1A) is connected to the PCB 30 and is wrapped around a portion of the outer periphery of the storage compartment 10. The other LEDs are mounted to the ribbon 36 and installed in the sidewall aperture 32. The ribbon 36 electrically connects the LEDs mounted thereon to the PCB.

Thus, no unsightly features are present in the interior of the storage compartment to obstruct the view of the lighting.

In the preferred embodiment the divider 12 includes a magnet 40 that activates a reed switch 42 (FIG. 3) mounted on the PCB 30. The PCB includes circuitry that activates the third light source 18 (at the rear of the storage compartment) when divider 12 is removed: As the rearward, third light source 18 directs light forwardly to illuminate the storage compartment, the resultant illumination will not distract the occupants, and in particular the driver and passenger are spared the direct glare from the LED or other light generating element of the third light source 18. When the divider 12 in placed in position, the rearward, third light source 18 is deactivated, and the two opposing light sources 16A, 16B on each side of the divider 12 are activated, illuminating the divider 12. The divider is preferably semi-opaque, thus providing a glow effect.

Figure 3:
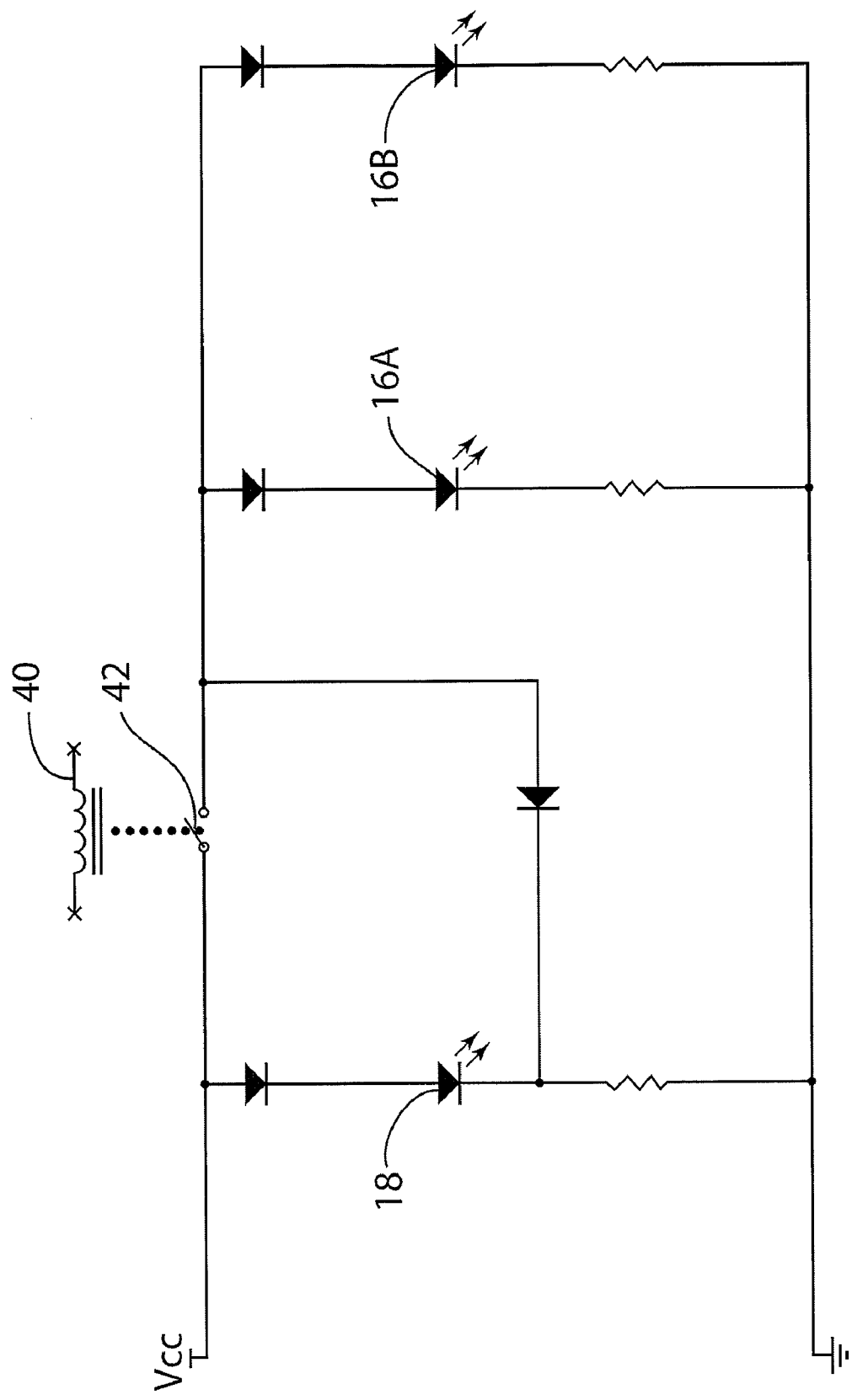
FIG. 3 is a circuit diagram for controlling the light sources.

FIG. 3 shows a preferred circuit for controlling the light sources. Vcc is a 12 volt park lamp, head lamp or backlighting feed. The reed switch 42 (S1) is normally open, so when Vcc is applied, the rear, third light source 18 (D11) is activated. When the magnet 40 (L1) is brought into close proximity with the reed switch 42 (S1), the rear, third light source 18 (D11) is shorted by diode D4 and Vcc is applied to the two opposing light sources 16A, 16B (D12 and D13).

Figure 4:
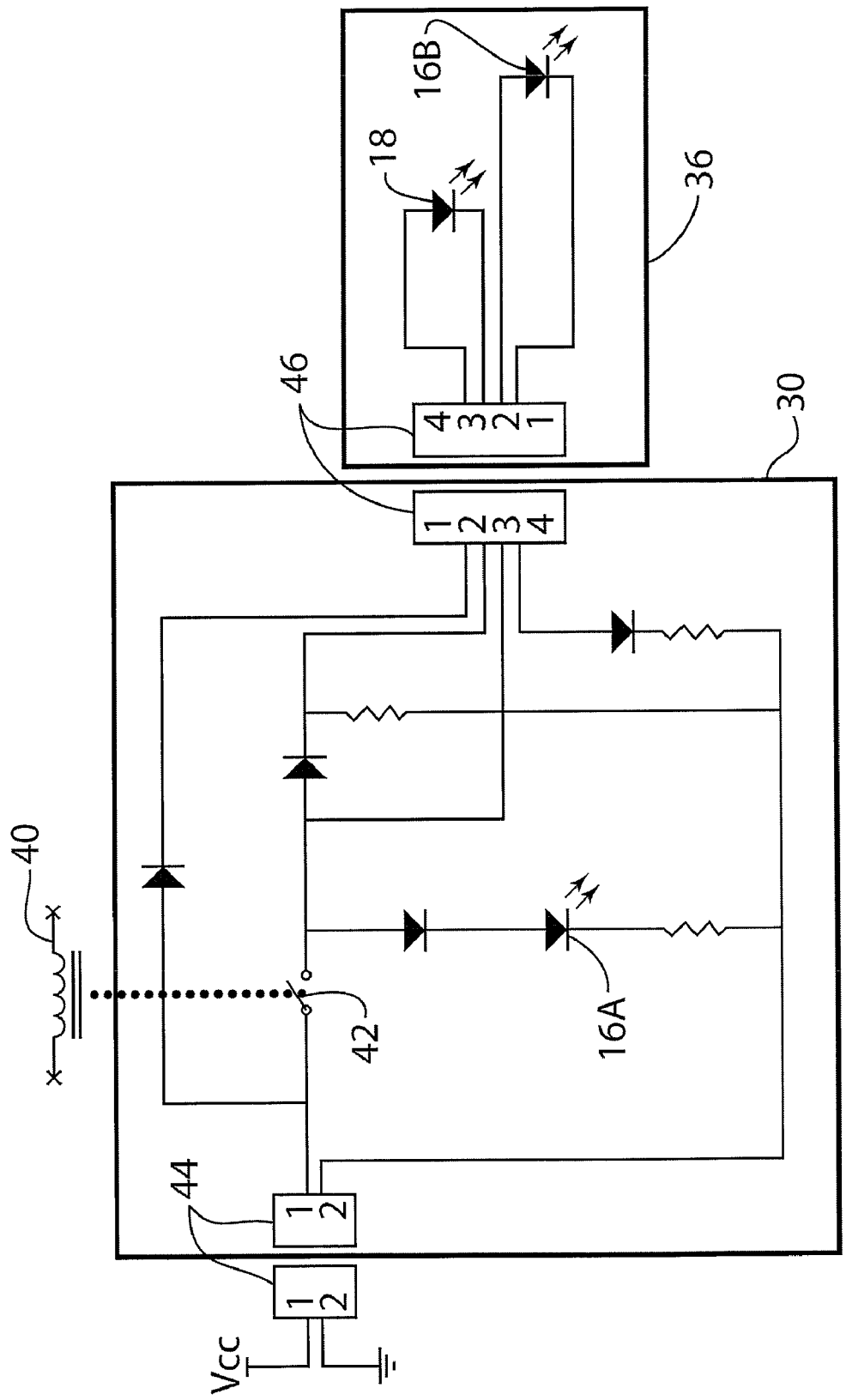
FIG. 4 is a wiring diagram for packaging circuit shown in FIG. 3.

FIG. 4 shows an electrical packaging schematic for the system. Connectors 44 interconnect the PCB 30 with the vehicular accessory wiring harness that supplies Vcc. Connectors 46 interconnect the PCB 30 with the ribbon 36.

From the foregoing, it will be appreciated that the circuitry has no physical electrical connection to the divider 12, or mechanical connection that would activate a switch mechanically. In an alternate embodiment, a mechanical switch could be used to perform the necessary tasks, but that is less desirable because it creates a potential leak path for liquids to reach the electrical components.

While the above describes a particular embodiment(s) of the invention, it will be appreciated that modifications and variations may be made to the detailed embodiment(s) described herein without departing from the spirit of the invention.

What is claimed is:

1. A vehicular storage compartment, comprising:
   two or more light sources for illuminating the storage compartment,
   a removable divider to establish two or more sub-compartments when the divider is inserted into the storage compartment, and
   a switch for selectively turning on and off one or more of the light sources, wherein the switch is opened and closed by the presence of the removable divider in the storage compartment.

2. The vehicular storage compartment according to claim 1, including a circuit board having a flexible portion with at least one light generating source mounted thereon, the flexible portion being wrapped at least partially around an outer periphery of the storage compartment, and the light generating source providing illumination into the interior of the storage compartment via an aperture therein.

3. The vehicular storage compartment according to claim 1, wherein the switch is a reed switch mounted in or proximate to a wall of the storage compartment and the removable divider incorporates a magnet therein that is located to activate the reed switch when the divider is installed in the storage compartment.

* * * * *

UNITED STATES PATENT AND TRADEMARK OFFICE
CERTIFICATE OF CORRECTION

PATENT NO. : 8,317,378 B2
APPLICATION NO. : 12/765202
DATED : November 27, 2012
INVENTOR(S) : Mark E. Dixon Page 1 of 1

It is certified that error appears in the above-identified patent and that said Letters Patent is hereby corrected as shown below:

In the Specifications:

Column 2
Line 61, "removed:" should be --removed--

Signed and Sealed this
Twenty-eighth Day of May, 2013

Teresa Stanek Rea
*Acting Director of the United States Patent and Trademark Office*